US009338468B2

(12) United States Patent
Yang et al.

(10) Patent No.: US 9,338,468 B2

(45) Date of Patent: May 10, 2016

(54) LATENCY AWARE PRIORITY BASED MULTI-CHANNEL DECODING

(75) Inventors: Michael (Zhijie) Yang, Irvine, CA (US); Sherman (Xuemin) Chen, Rancho Santa Fe, CA (US); Brian Heng, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 746 days.

(21) Appl. No.: 13/339,674

(22) Filed: Dec. 29, 2011

(65) Prior Publication Data

US 2013/0170560 A1 Jul. 4, 2013

(51) Int. Cl.

| | |
|---|---|
| ***H04N 7/26*** | (2006.01) |
| ***H04N 19/436*** | (2014.01) |
| ***H04N 19/44*** | (2014.01) |

(52) U.S. Cl.

CPC ............. *H04N 19/436* (2014.11); *H04N 19/44* (2014.11)

(58) Field of Classification Search

CPC ................... H04N 19/00521; H04N 19/00533

See application file for complete search history.

(56) References Cited

U.S. PATENT DOCUMENTS

| | | | | |
|---|---|---|---|---|
| 6,049,549 | A * | 4/2000 | Ganz et al. | 370/449 |
| 2011/0035647 | A1 * | 2/2011 | Eidson | H03G 3/3068 714/780 |
| 2011/0310995 | A1 * | 12/2011 | Dougherty, III | G02B 27/22 375/295 |

* cited by examiner

*Primary Examiner* — Andy Rao

*Assistant Examiner* — Tyler Edwards

(74) *Attorney, Agent, or Firm* — Foley & Lardner LLP

(57) ABSTRACT

Various methods and systems are provided for latency aware priority based decoding. In one embodiment, among others, a method includes providing coded frames of a first input stream to a multiple channel (multi-channel) decoder for decoding. A second input stream is obtained and a latency priority associated with the second input stream is determined. Coded frames from the first and second input streams are provided to the multi-channel decoder for decoding in an order based upon the latency priorities associated with the first and second input streams. In another embodiment, a multi-channel decoding system includes a multi-channel decoder configured to decode coded frames and a decoder input scheduler configured to provide coded frames from a plurality of input streams to the multi-channel decoder for decoding. The coded frames are provided to the multi-channel decoder in an order based at least in part upon latency priorities associated with the input streams.

22 Claims, 12 Drawing Sheets

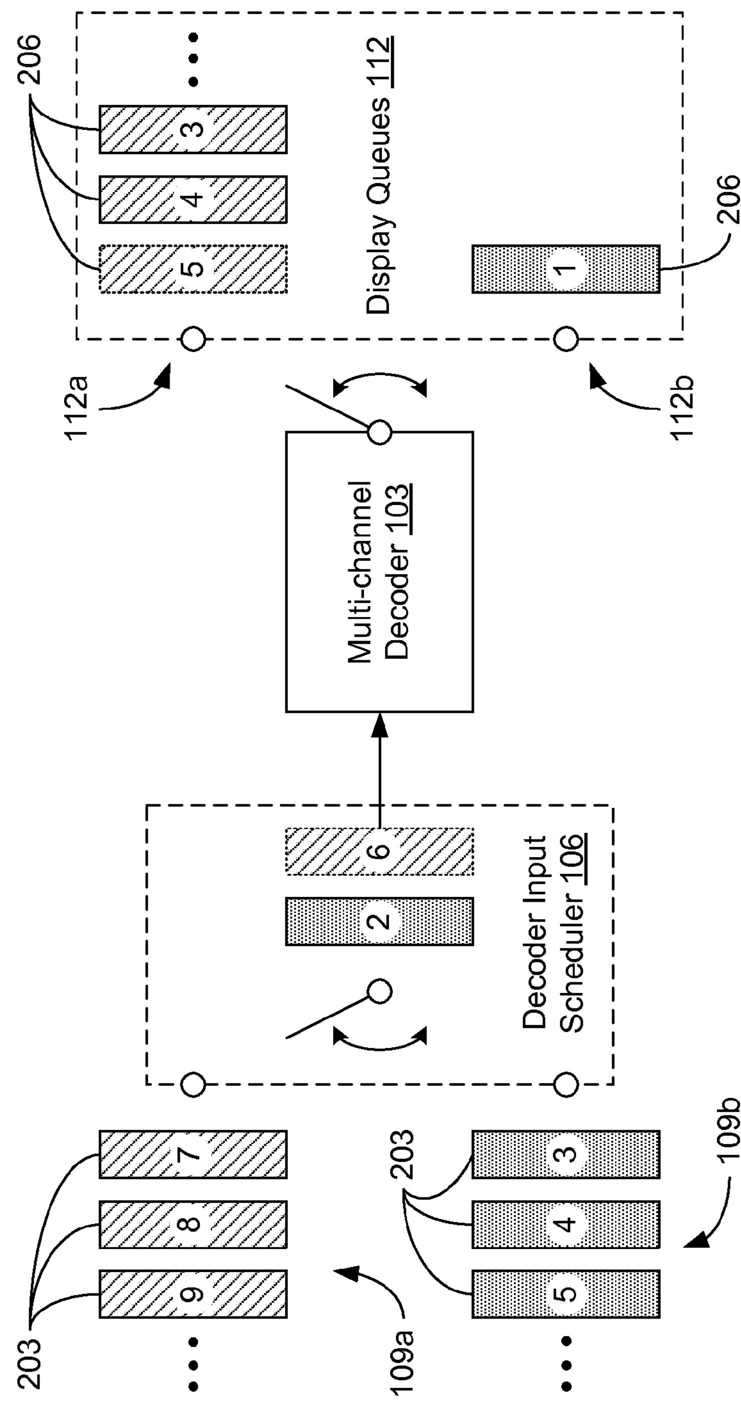
FIG. 6B
FIG. 6C
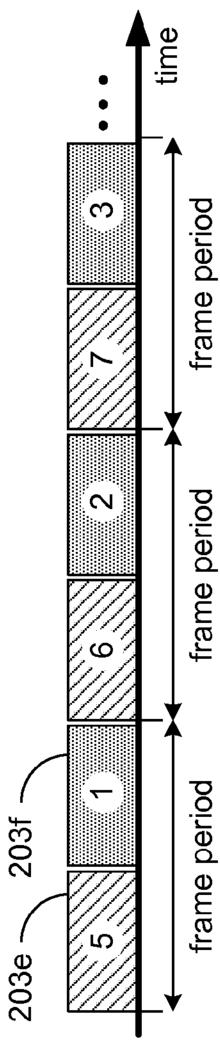

LATENCY AWARE PRIORITY BASED MULTI-CHANNEL DECODING

BACKGROUND

While standards like MPEG-2 assume instantaneous decoding of video, real decoders are never instantaneous. Typical single channel real time decoders have been designed with a worst case frame decoding time of one frame period. Thus, for a single channel decoder designed for a rate of 30 frames per second, the decoding latency is considered to be 33.3 ms for the processed channel. Multiple channel decoders allow for decoding of different channels by the same decoder. The order in which the channels were received for decoding governs the decoding latency of each channel which can impact the display of the decoded pictures.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2, 3A-3C, 4A-4D, 5, 6A-6C, and 7A-7D are graphical representations illustrating the operation of the latency aware priority based decoding system of FIG. 1 in accordance with various embodiments of the present disclosure.

DETAILED DESCRIPTION

Figure 1:
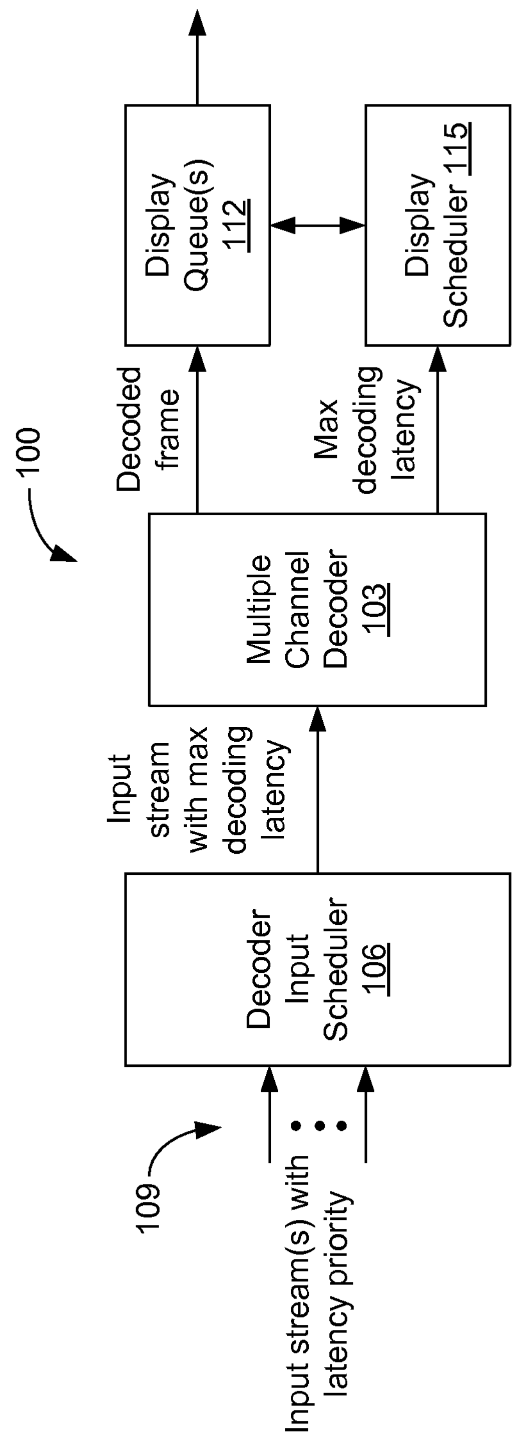
FIG. 1 is a graphical representation of an example of a latency aware priority based decoding system in accordance with various embodiments of the present disclosure.

Disclosed herein are various embodiments of methods and systems related to latency aware priority based decoding. Reference will now be made in detail to the description of the embodiments as illustrated in the drawings, wherein like reference numbers indicate like parts throughout the several views.

Low latency decoding is increasingly important in video decoders used in interactive online video services such as, e.g., video conferencing and interactive video gaming. A multiple channel (multi-channel) decoder includes more decoding capabilities than a single channel decoder, allowing the decoding of multiple streams in a time shared fashion. The increased processing capability of the multi-channel decoder allows it to process streams from two or more channels. For example, a dual channel high definition (HD) H.264/AVC decoder is capable of decoding 1080p60 at a rate of 60 frames per second, and hence can decode two 1080p30 channels, each at a rate of 30 frames per second. If the dual channel HD decoder is idle when a 1080p30 video stream is sent to the dual channel HD decoder, the decoding latency of the received channel is 16.7 ms. If the dual channel HD decoder is already decoding a first 1080p30 channel when a second 1080p30 stream is received, the dual channel HD decoder will wait for the current frame of the first channel to be finished before starting to decode the first frame of the second channel. Thus, the decoding latency of the second 1080p30 channel is between 16.7 ms and 33.3 ms. When presentation time is considered, the worst case decoding latency of the second channel should be considered to be 33.3 ms. So the first channel always has a lower latency than the second channel, no matter which channel requires a lower decoding latency.

Latency aware priority based decoding allows for modification of the channel processing order by the multi-channel decoder based at least in part upon a latency priority of each incoming stream. Referring to FIG. 1, shown is an example of a latency aware priority based decoding system 100 including a multi-channel decoder 103 and a decoder input scheduler 106. The decoder input scheduler 106 is configured to receive input streams 109 from a plurality of channels for decoding by the multi-channel decoder 103. The processing capability of the multi-channel decoder 103 allows for decoding of a plurality input streams 109 in real time by decoding a portion (e.g., a coded pixel blocks or frame) of each of the input streams 109 within a frame period. The decoding latency for each input stream depends upon the processing capability of the multi-channel decoder 103 and the ordering of the input stream decoding. By arranging the order of the input stream processing within a frame period, the latency aware priority based decoding system 100 may adjust for the latency needs of the different input streams 109.

An input stream 109 can include latency priority information indicating the latency needs for the corresponding service. For example, an input stream 109 may include information that indicates the latency priority as a defined part of the elementary stream layer information such as, e.g., the sequence header, or other location in the channel stream as appropriate. In one embodiment, a stream with a normal latency priority may be indicated as "0" and a stream with a low latency priority may be indicated as "1" as a defined part of the sequence header. In other implementations, multiple levels of low latency priority may be utilized. The latency priority information may be extracted from the channel stream when it is obtained by the decoder input scheduler 106 to determine the latency priority of the input stream. In other implementations, the latency priority information may be based upon the application associated with the channel stream. Different applications may have corresponding latency priorities that may be used to determine the scheduling of the input streams 109. While this disclosure will explain examples in terms of two latency priority levels, the examples can be extended to include embodiments having multiple latency priority levels.

The decoder input scheduler 106 schedules the decoding order of each of the channels based at least in part upon the latency priority of the incoming streams. Time sharing of the multi-channel decoder 103 allows for decoding multiple streams in real time. In this way, coded pixel blocks (CPBs) or frames from each of the channels may be decoded sequentially in a given frame period based upon the latency priorities of the channels. The decoded frames are provided to display queue(s) 112 for provision to a display device. A display scheduler 115 considers a maximum decoding latency corresponding to each channel to coordinate the frame display.

For instance, an input stream 109 with an associated latency priority is sent to the decoder input scheduler 106, which sends the input stream 109 to the multi-channel decoder 103 for decoding. The decoded frames are provided by the multi-channel decoder 103 to a display (or picture delivery) queue 112 corresponding to the channel of the input stream 109. In addition, the decoder input scheduler 106 also determines the maximum decoding latency of the input stream 109. The display scheduler 115 uses the maximum decoding latency to coordinate the display of each decoded frame in the display queue 112. When another input stream 109 is sent to the decoder input scheduler 106, it arranges the decoding order based upon the latency priority of the incoming input stream 109 and the input stream 109 that is already being decoded. The decoder input scheduler 106 also determines the maximum decoding latency of the other incoming input stream 109. The multi-channel decoder 103 decodes the input streams 109 in the order provided by the decoder input scheduler 106 and outputs the decoded frames to the corresponding display queue 112 of each channel. The display scheduler 115 coordinates the display of each frame based upon the maximum decoding latencies that were estimated in the decoding scheduler 106.

Figure 2:
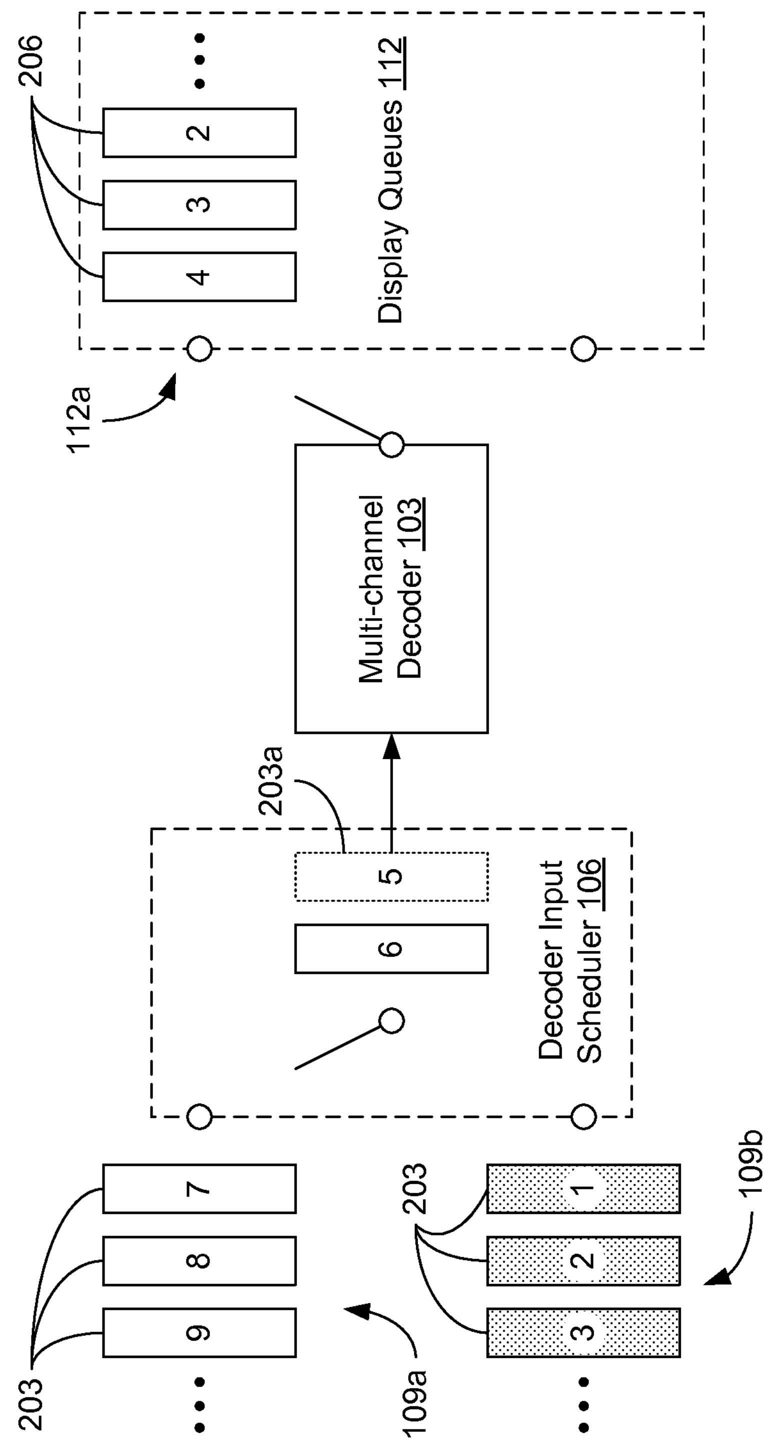

Referring to FIG. 2, shown is an example of latency aware priority based decoding of input streams 109 from two channels. In the example of FIG. 2, the multi-channel decoder 103 is capable of decoding at least two 1080p30 input streams 109 in real time. Initially, CPBs (or coded frames) 203 of a first input stream 109*a* of a first channel are obtained by the decoder input scheduler 106 and directed to the multi-channel decoder 103 for decoding. In addition, the decoder input scheduler 106 determines the latency priority associated with the first input stream 109*a*. The latency priority information included in the first input stream 109*a* may indicate a latency priority such as, e.g., a normal latency priority, a low latency priority, or one of a plurality of low latency priorities. The latency priority may be determined from, e.g., a bit or bits in the header or may be determined based upon an application or application type associated with the input stream 109*a*.

In the example of FIG. 2, the latency priority information indicates a normal latency priority (e.g., as indicated by a “0” in the sequence header). A maximum decoding latency for the input stream 109*a* is determined by the decoder input scheduler 106 based upon the latency priority. For a 1080p30 stream with normal latency priority, the maximum decoding latency is set to be one frame period of 33.3 ms. Because of the excess processing capability of the multi-channel decoder 103, the frames are decoded in less time than the normal decoding latency. After decoding by the multi-channel decoder 103, the decoded frames or pictures 206 are provided to a corresponding display (or picture delivery) queue 112*a*. The display scheduler 115 (FIG. 1) uses the maximum decoding latency to coordinate the display of each decoded frame 206.

Figure 3A:
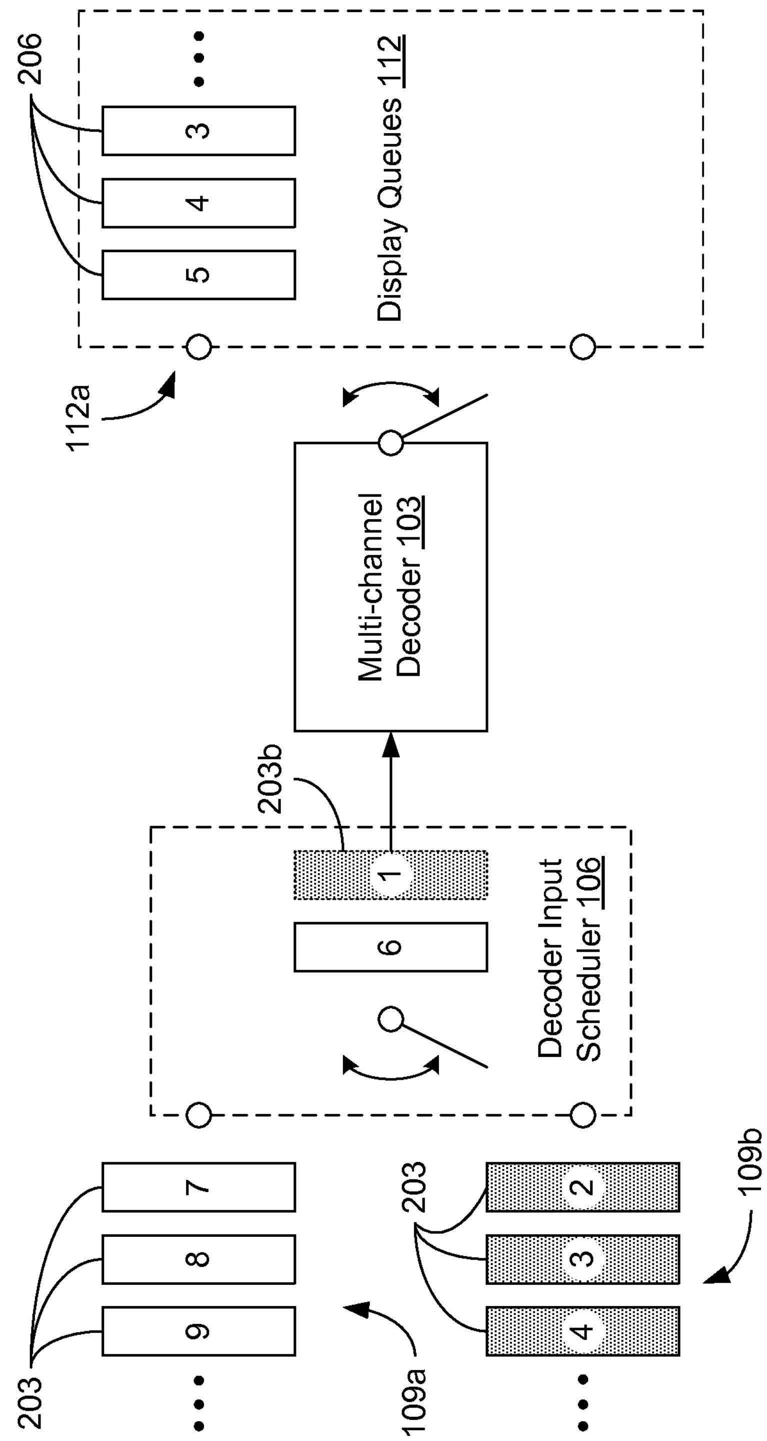

When a second input stream 109*b* is received by the decoder input scheduler 106, the decoder input scheduler 106 determines the latency priority of the new input stream 109*b* and arranges the order of the CPBs (or coded frames) 203 of the two input streams 109*a* and 109*b* for decoding based upon the corresponding latency priorities. Referring to FIG. 3A, shown is an example of latency aware priority based decoding where the second input stream 109*b* also has the same normal latency priority as the first stream 109*a* (e.g., indicated by a “0” in the sequence header). If the second input stream 109*b* also has a normal latency priority, the decoder input scheduler 106 provides the first CPB or coded frame 203*b* of the second input stream 109*b* for decoding after the multi-channel decoder 103 finishes decoding the current CPB or coded frame 203*a* (FIG. 2) of the first input stream 109*a*. The processing capability of the multi-channel decoder 103 allows a coded frame 203 from the first input stream 109*a* and a coded frame 203 from the second input stream 109*b* to be decoded during the same frame period.

Figure 3B:
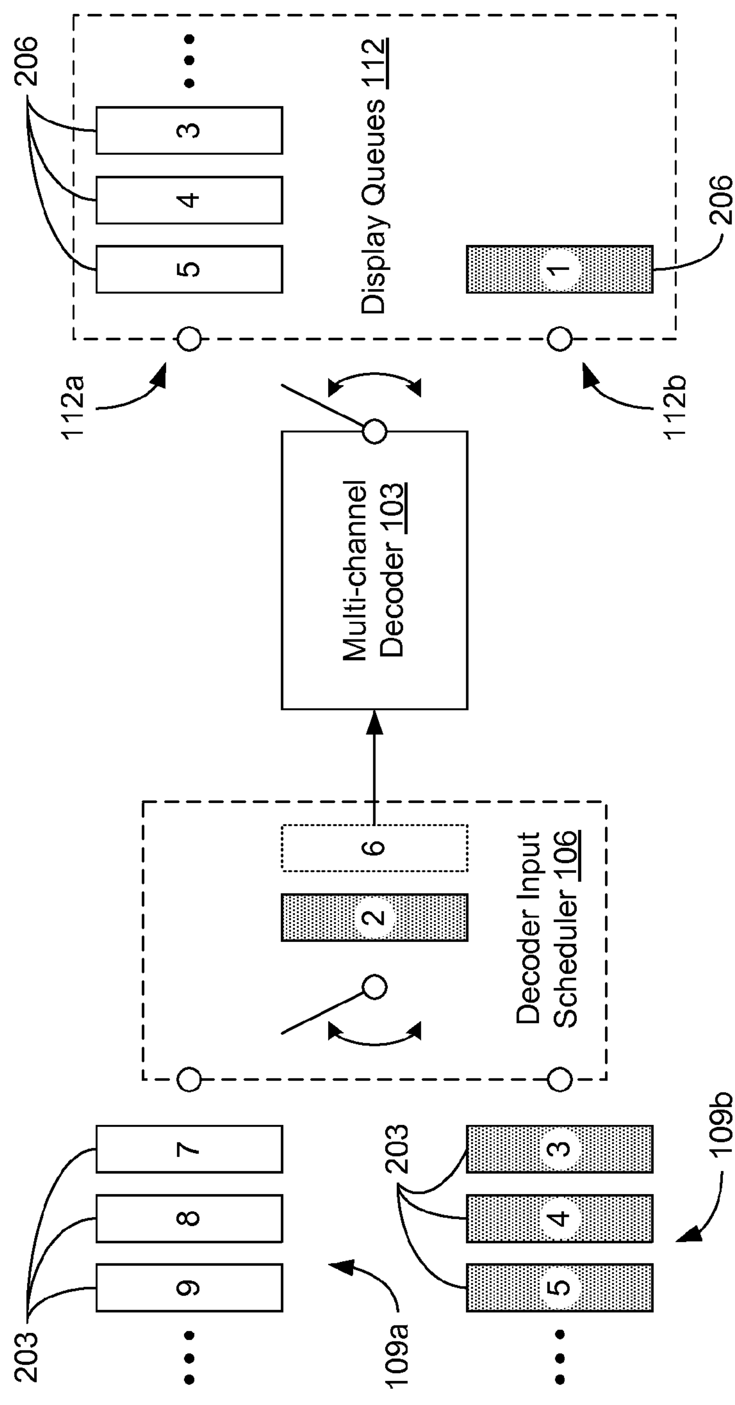
Figure 3C:
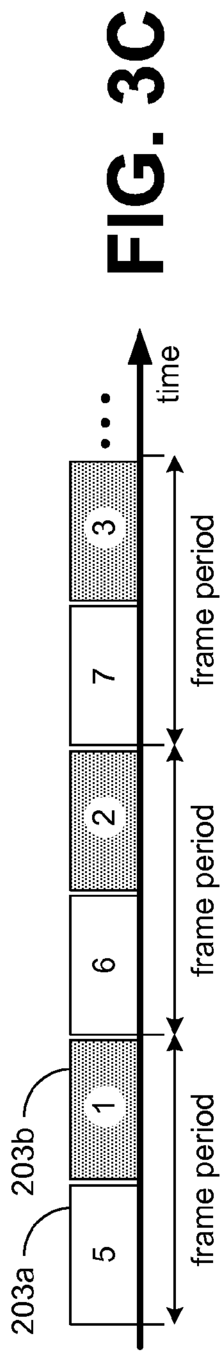

After decoding the first CPB or coded frame 203*b* of the second input stream 109*b* by the multi-channel decoder 103, the decoded frame or picture 206 is provided to a corresponding display (or picture delivery) queue 112*b* as illustrated in FIG. 3B. The decoder input scheduler 106 continues to arrange the CPBs or coded frames 203 of the 1080p30 input streams 109*a* and 109*b* in an alternating fashion for decoding. Because the second input stream 109*b* also has a normal latency priority, the maximum decoding latency for the second 1080p30 channel is also set to be the frame period of 33.3 ms and used by the display scheduler 115 (FIG. 1) to coordinate the display of each decoded frame 206 in the display queue 112*b*. FIG. 3C illustrates a portion of the decoding sequence arranged by the decoder input scheduler 106. In each frame period, a CPB or coded frame 203 of the first channel is decoded followed by decoding a CPB or coded frame 203 of the second channel. Because of the excess processing capability of the multi-channel decoder 103, both coded frames 203 are decoded within the normal decoding latency.

Figure 4A:
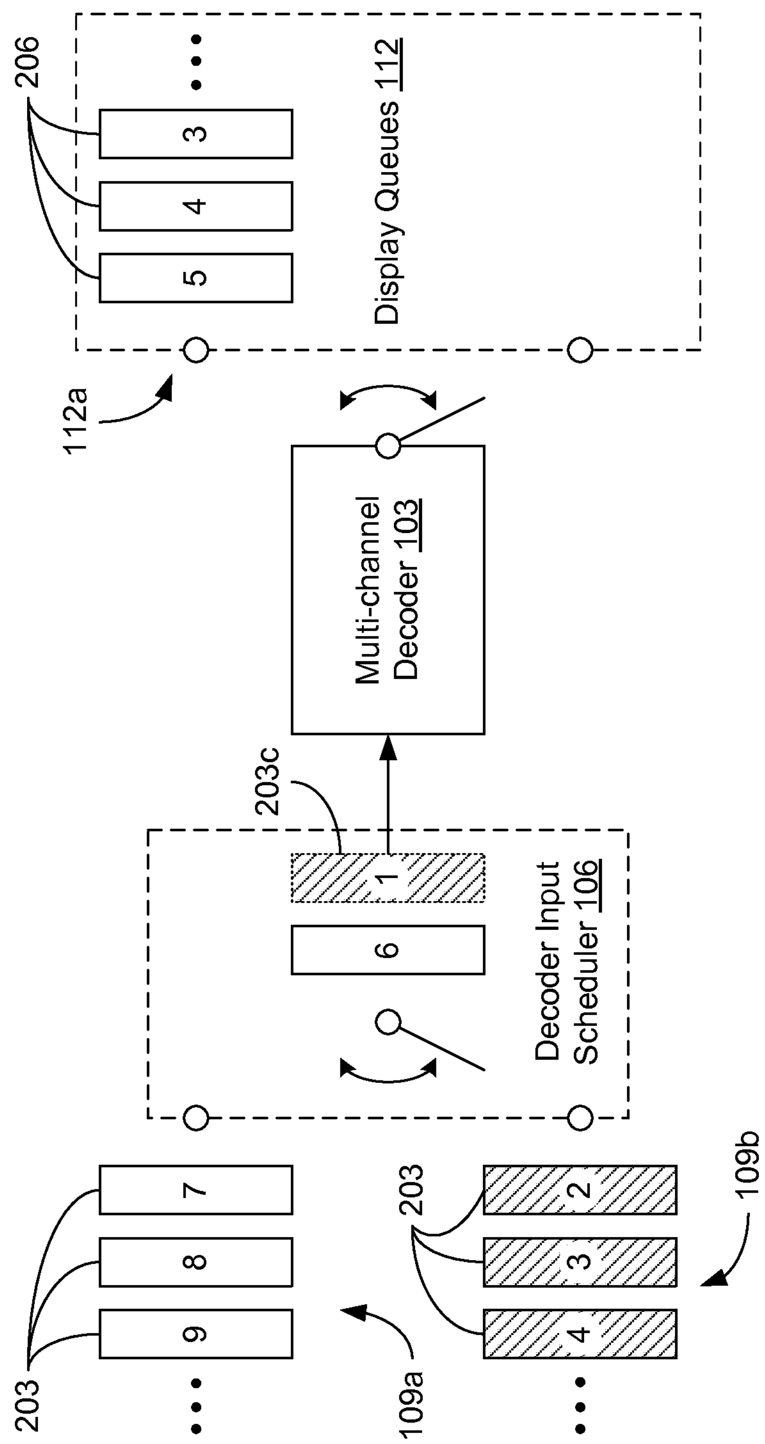

If the second input stream 109*b* is determined to have a low latency priority indicating that the decoding latency of the second channel is less than the decoding latency of the first channel, then the order of decoding is adjusted by the decoder input scheduler 106. Referring to FIG. 4A, shown is an example of latency aware priority based decoding where the second input stream 109*b* also has a low latency priority. If the second input stream 109*b* has a low latency priority (e.g., indicated by a “1” in the sequence header), the decoder input scheduler 106 again provides the first CPB or coded frame 203*c* of the second input stream 109*b* for decoding after the multi-channel decoder 103 finishes decoding the current CPB or coded frame 203*a* (FIG. 2) of the first input stream 109*a*. However, an indication such as, e.g., an output flag is provided (or set) by the decoder input scheduler 106 so that the first CPB or coded frame 203*c* of the second input stream 109*b* is not provided to the display queue 112*b*, but is instead discarded by the display scheduler 115 (FIG. 1) after decoding.

Figure 4B:
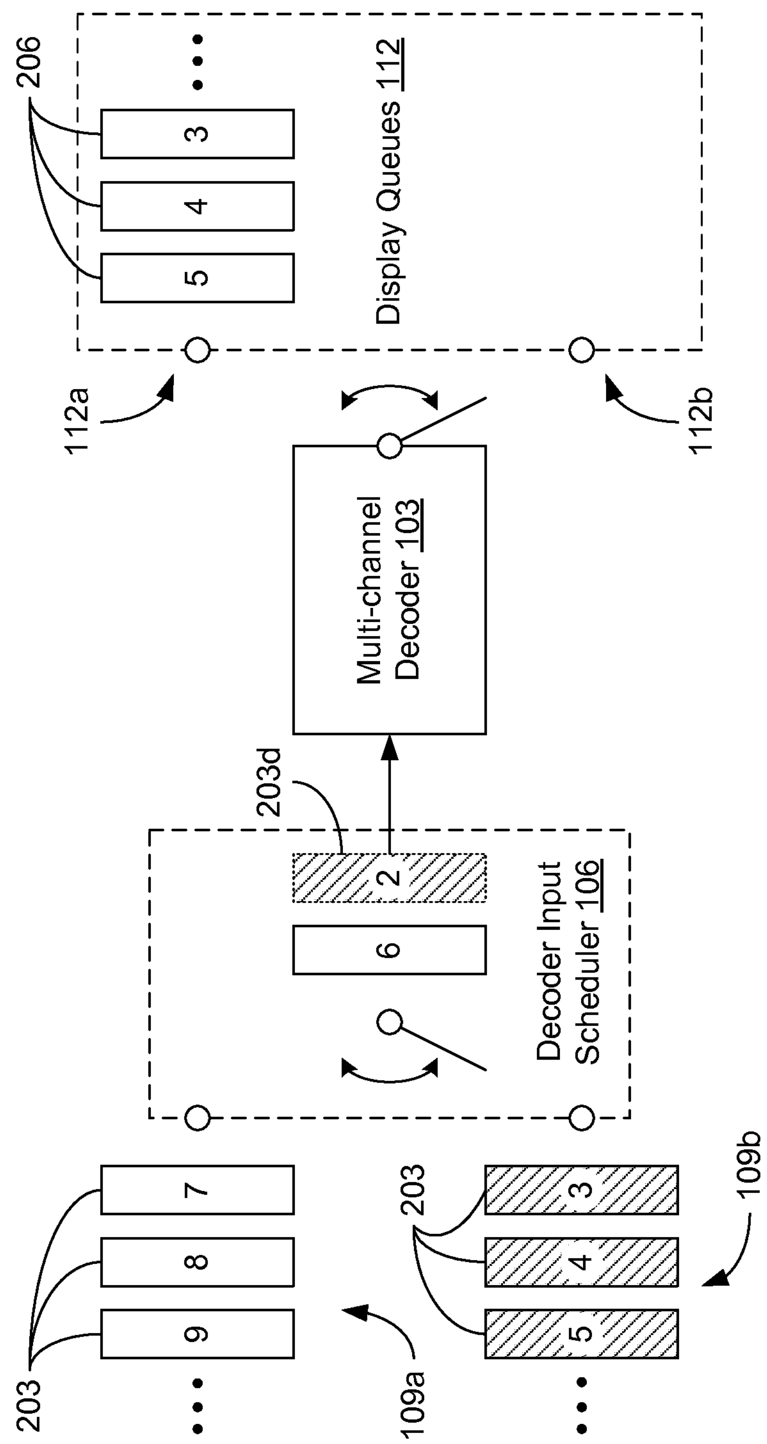
Figure 4C:
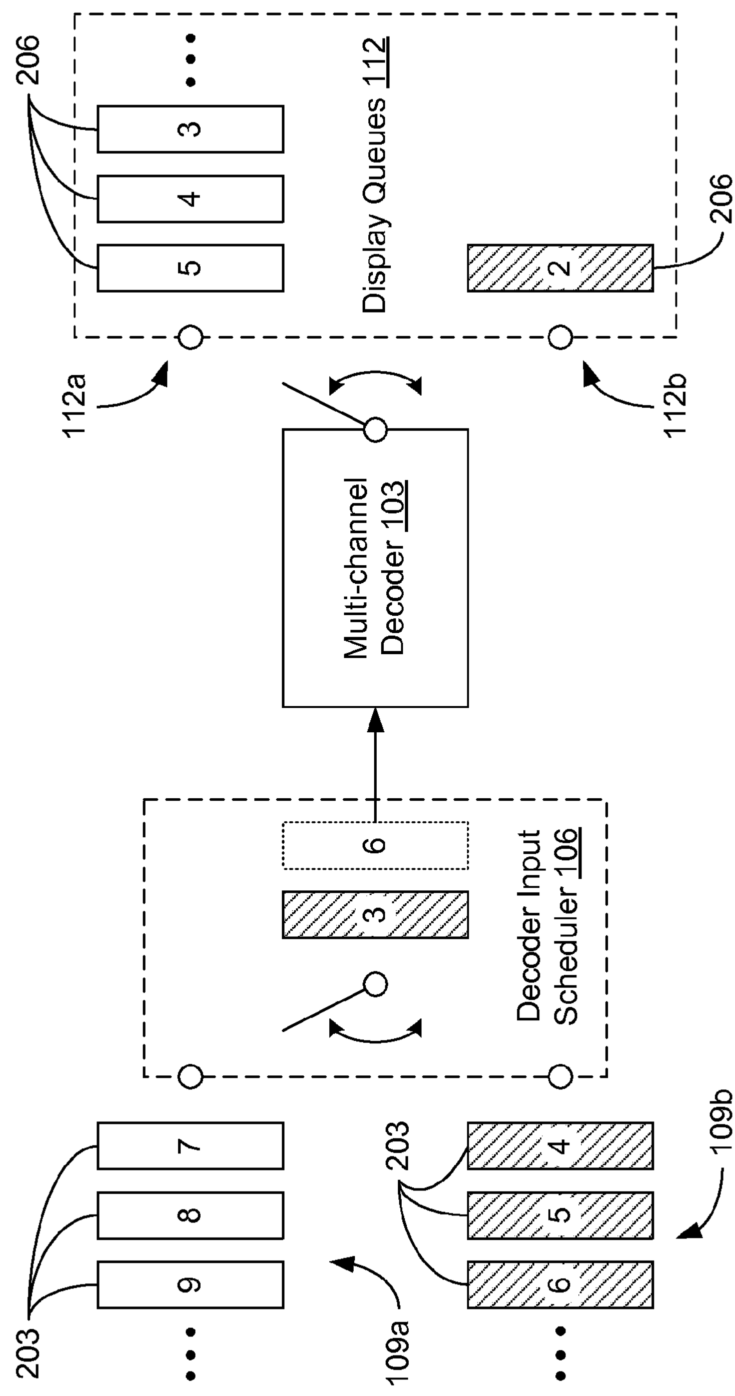
Figure 4D:
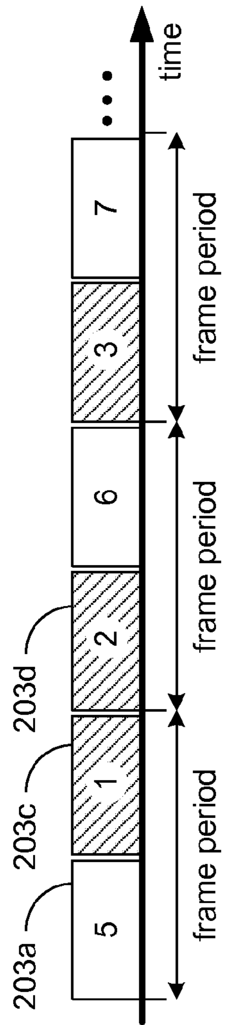

In addition, the decoder input scheduler 106 provides the second CPB or coded frame 203*d* of the second input stream 109*b* for decoding as illustrated in FIG. 4B. After decoding the first CPB or coded frame 203*c* of the second input stream 109*b* is finished, the multi-channel decoder 103 begins decoding the second CPB or coded frame 203*d* of the second input stream 109*b* at the beginning of the next frame period and provides the decoded frame or picture 206 to the corresponding display (or picture delivery) queue 112*b* as illustrated in FIG. 4C. Thus, the order of decoding during a frame period is reversed with a CPB or coded frame 203 of the second input stream 109*b* being decoded before a CPB or coded frame 203 of the first input stream 109*a*. The decoder input scheduler 106 continues to arrange the CPBs or coded frames 203 of the 1080p30 input streams 109*a* and 109*b* in an alternating fashion for decoding. In this way, a lower decoding latency is provided for the second input stream 109*b* based upon the low latency priority. FIG. 4D illustrates a portion of the decoding sequence arranged by the decoder input scheduler 106 to illustrate the reversed order. After decoding the first CPB or coded frame 203*c* (FIG. 4A) of the second input stream 109*b*, the second CPB or coded frame 203*d* of the second channel is decoded followed by decoding a CPB or coded frame 203 of the first channel. In the following frame periods, a CPB or coded frame 203 of the second channel is decoded followed by decoding a CPB or coded frame 203 of the first channel. Because of the excess processing capability of the multi-channel decoder 103, coded frames 203 of the second input stream 109*b* are decoded within the low decoding latency and coded frames 203 of the first input stream 109*a* are decoded within the normal decoding latency.

Referring back to FIG. 4A, the decoder input scheduler 106 also determines the maximum decoding latency of the second input stream 109*b*. Because the second input stream 109*b* has a low latency priority, the maximum decoding latency for the second 1080p30 channel can be set to be 16.7 ms based upon the processing capability of the multi-channel decoder 103. As the processing capability of the multi-channel decoder 103 increases, the decoding latency decreases and the number of input streams 109 that can be handled in a frame period may increase. The display scheduler 115 (FIG. 1) uses the maximum decoding latencies to coordinate the display of each decoded frame in the corresponding display queues 112.

Figure 5:
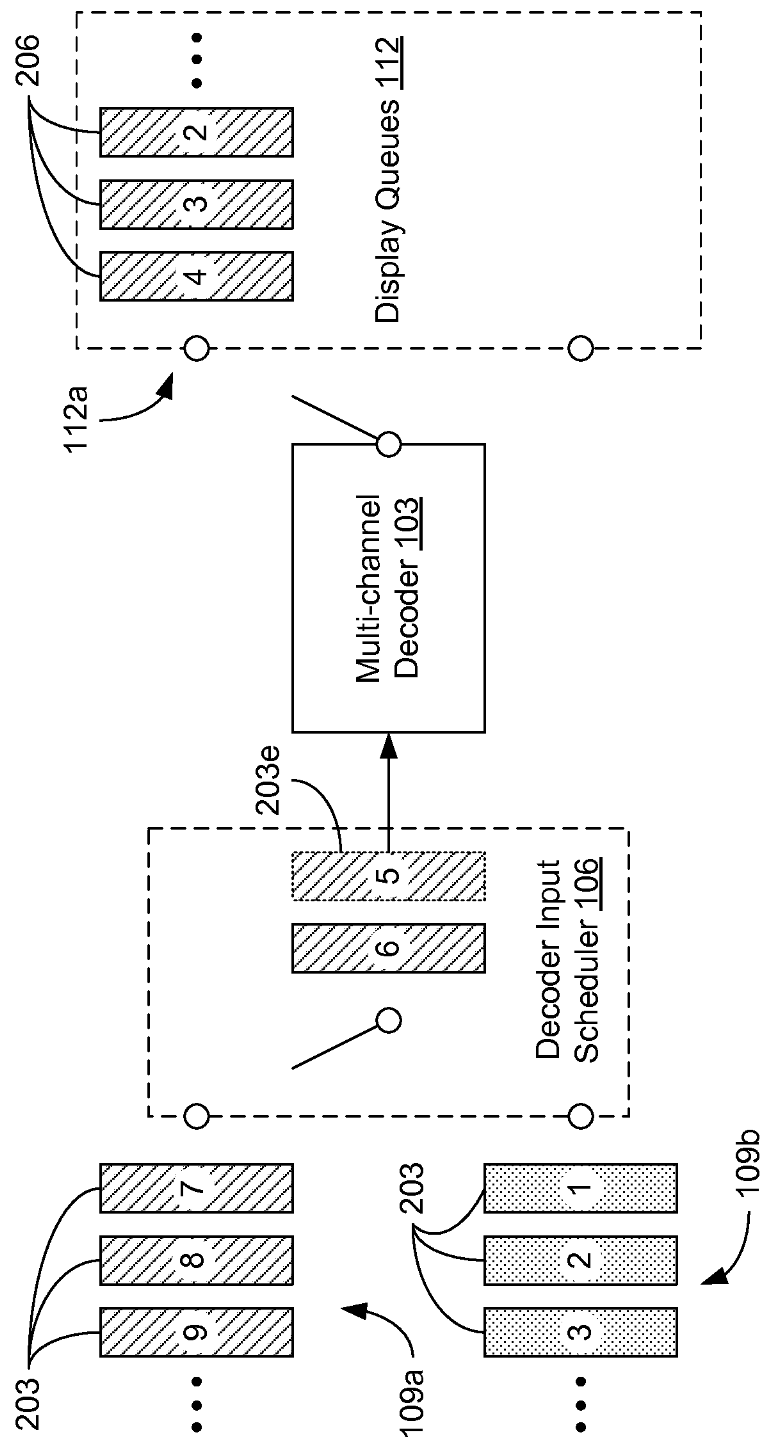

Referring now to FIG. 5, illustrated is an example of latency aware priority based decoding of input streams 109 from two channels when the first input stream 109*a* has low latency priority. As in the example of FIG. 2, the multi-channel decoder 103 is capable of decoding at least two 1080p30 input streams 109 in real time. Initially, CPBs (or coded frames) 203 of a first input stream 109*a* of a first channel are obtained by the decoder input scheduler 106 and directed to the multi-channel decoder 103 for decoding. In addition, the decoder input scheduler 106 determines the latency priority associated with the first input stream 109*a*. In the example of FIG. 5, the latency priority information included in the first input stream 109*a* indicates a low latency priority (e.g., as indicated by a "1" in the sequence header). For a 1080p30 stream with low latency priority, the maximum decoding latency is set to be 16.7 ms. Because of the excess processing capability of the multi-channel decoder 103, the frames are decoded in less time than the low decoding latency. After decoding by the multi-channel decoder 103, the decoded frames or pictures 206 are provided to a corresponding display (or picture delivery) queue 112*a*. The display scheduler 115 (FIG. 1) uses the maximum decoding latency to coordinate the display of each decoded frame 206.

Figure 6A:
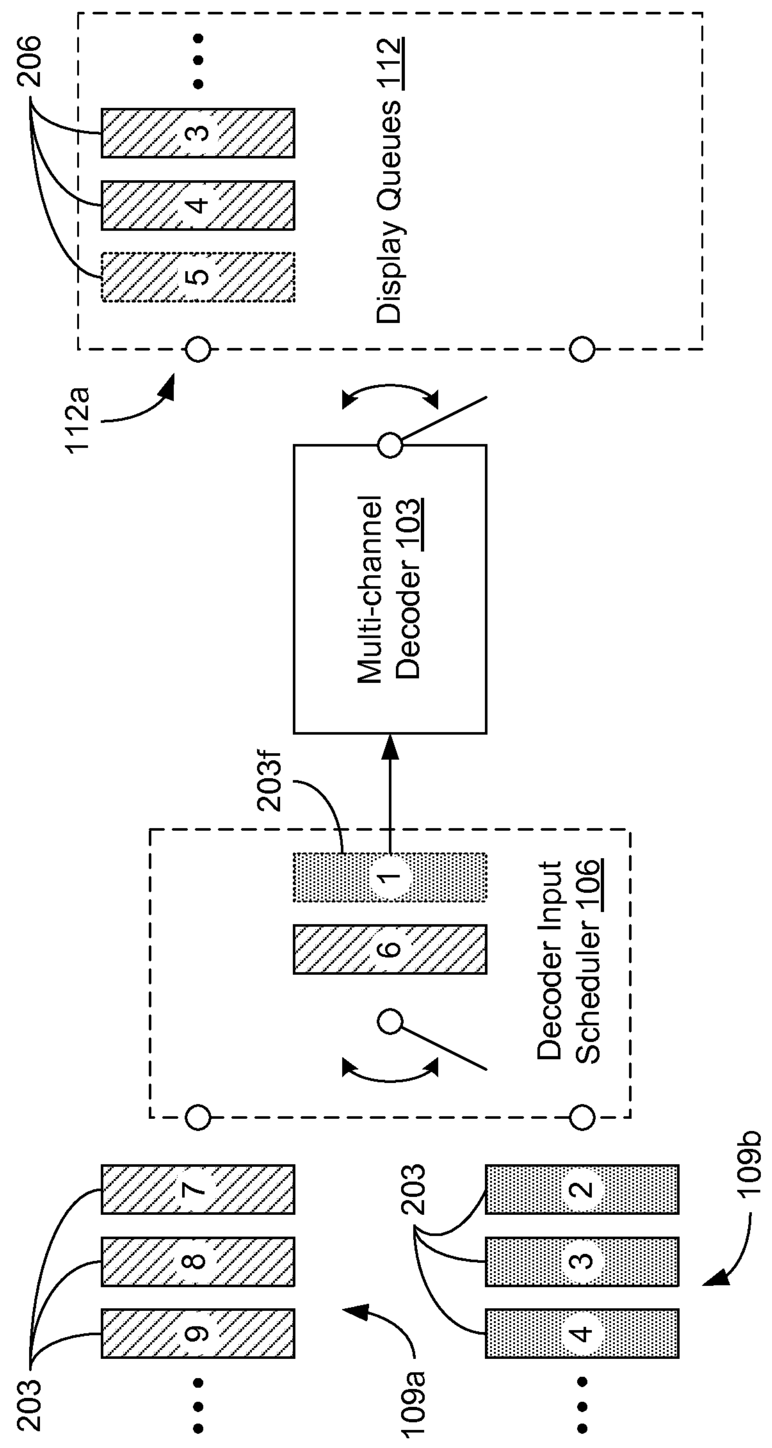

When a second input stream 109*b* is received by the decoder input scheduler 106, the decoder input scheduler 106 determines the latency priority of the new input stream 109*b* and arranges the order of the CPBs (or coded frames) 203 of the two input streams 109*a* and 109*b* for decoding based upon the corresponding latency priorities. Referring to FIG. 6A, shown is an example of latency aware priority based decoding where the second input stream 109*b* has a normal latency priority (e.g., indicated by a "0" in the sequence header). If the second input stream 109*b* has a normal latency priority, the decoder input scheduler 106 provides the first CPB or coded frame 203*f* of the second input stream 109*b* for decoding after the multi-channel decoder 103 finishes decoding the current CPB or coded frame 203*e* (FIG. 5) of the first input stream 109*a*.

After decoding the first CPB or coded frame 203*f* of the second input stream 109*b* by the multi-channel decoder 103, the decoded frame or picture 206 is provided to a corresponding display (or picture delivery) queue 112*b* as illustrated in FIG. 6B. The decoder input scheduler 106 continues to arrange the CPBs or coded frames 203 of the 1080p30 input streams 109*a* and 109*b* in an alternating fashion for decoding. Because the second input stream 109*b* has a normal latency priority, the maximum decoding latency for the second 1080p30 channel is set to be a frame period of 33.3 ms and used by the display scheduler 115 (FIG. 1) to coordinate the display of each decoded frame 206 in the display queue 112*b*. FIG. 6C illustrates a portion of the decoding sequence arranged by the decoder input scheduler 106. In each frame period, a CPB or coded frame 203 of the first channel is decoded followed by decoding a CPB or coded frame 203 of the second channel. Because of the excess processing capability of the multi-channel decoder 103, coded frames 203 of the first input stream 109*a* are decoded within the low decoding latency and coded frames 203 of the second input stream 109*b* are decoded within the normal decoding latency.

Figure 7A:
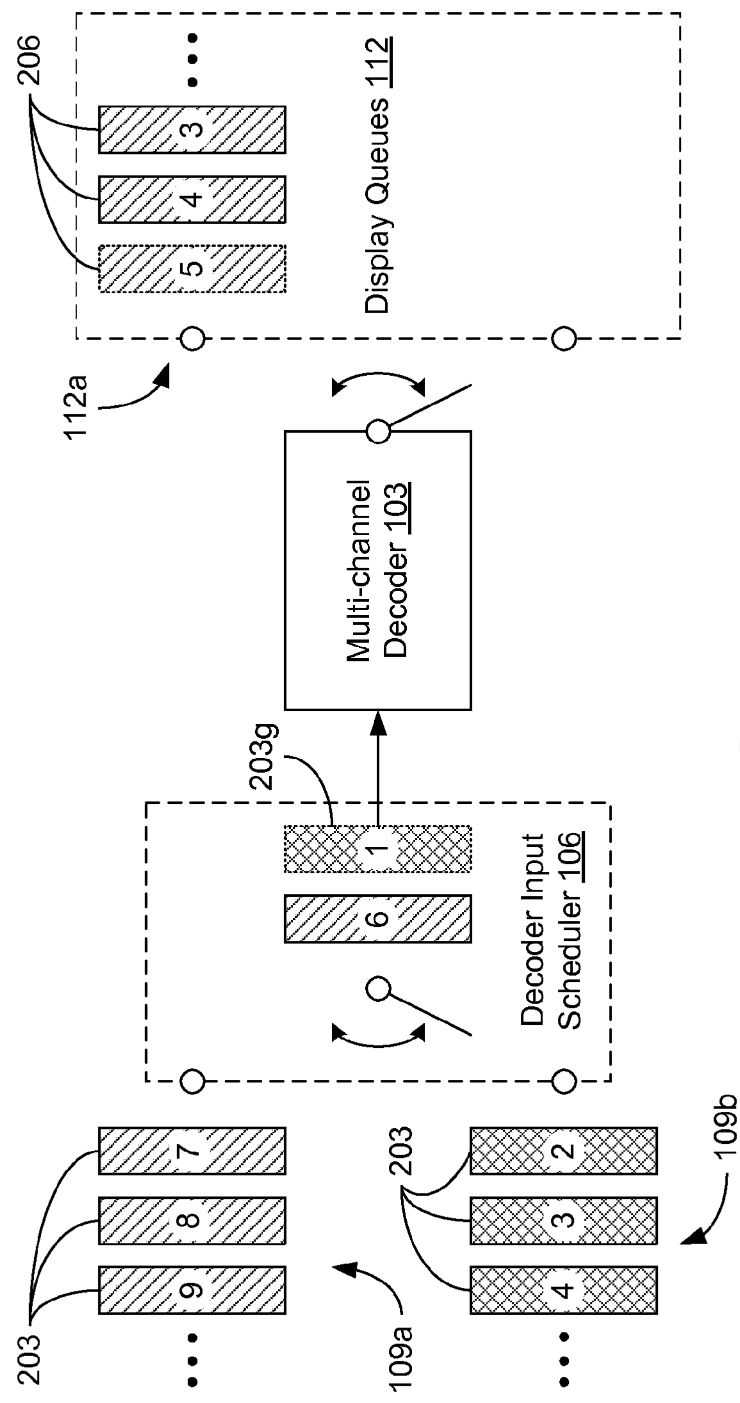

If the second input stream 109*b* is determined to also have a low latency priority (e.g., indicated by a "1" in the sequence header), then the order of decoding may be adjusted by the decoder input scheduler 106 in two ways. Referring to FIG. 7A, shown is an example of latency aware priority based decoding where the decoding latency of the first input stream 109*a* is minimized. The decoder input scheduler 106 provides the first CPB or coded frame 203*g* of the second input stream 109*b* for decoding after the multi-channel decoder 103 finishes decoding the current CPB or coded frame 203*e* (FIG. 5) of the first input stream 109*a*. After decoding by the multi-channel decoder 103, the decoded frame or picture 206 is provided to a display (or picture delivery) queue 112*b* corresponding to the second channel. The decoder input scheduler 106 continues to arrange the CPBs or coded frames 203 of the input streams 109*a* and 109*b* in an alternating fashion for decoding. Because the CPBs or coded frames 203 of the second input stream 109*b* are decoded after the CPBs or coded frames 203 of the first input stream 109*a*, the maximum decoding latency for the second 1080p30 channel is set to 33.3 ms and used by the display scheduler 115 (FIG. 1) to coordinate the display of each decoded frame 206 in the display queue 112*b*. The maximum decoding latency for the first 1080p30 channel remains 16.7 ms.

Figure 7B:
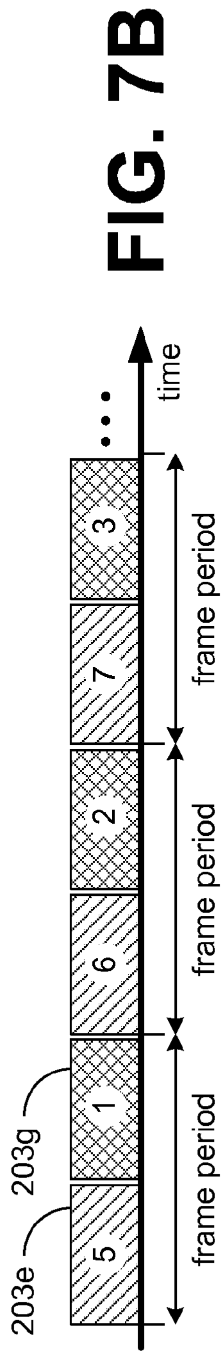

FIG. 7B illustrates a portion of the decoding sequence arranged by the decoder input scheduler 106. In each frame period, a CPB or coded frame 203 of the first channel is decoded followed by decoding a CPB or coded frame 203 of the second channel. Because of the processing capability of the multi-channel decoder 103, coded frames 203 of the first input stream 109*a* are decoded within the low decoding latency while coded frames 203 of the second input stream 109*b* are decoded with a longer latency. By increasing the processing capability of the multi-channel decoder 103, the decoding latency of the second input stream 109*a* may be reduced.

Alternatively, the order of decoding may be reversed by the decoder input scheduler 106 to provide the second channel with a lower decoding latency. As in FIG. 7A, the decoder input scheduler 106 provides the first CPB or coded frame 203*g* of the second input stream 109*b* for decoding after the multi-channel decoder 103 finishes decoding the current CPB or coded frame 203*e* (FIG. 5) of the first input stream 109*a*. However, an indication such as, e.g., an output flag is provided (or set) by the decoder input scheduler 106 so that the first CPB or coded frame 203*g* of the second input stream 109*b* is not provided to the display queue 112*b*, but is instead discarded by the display scheduler 115 (FIG. 1) after decoding.

Figure 7C:
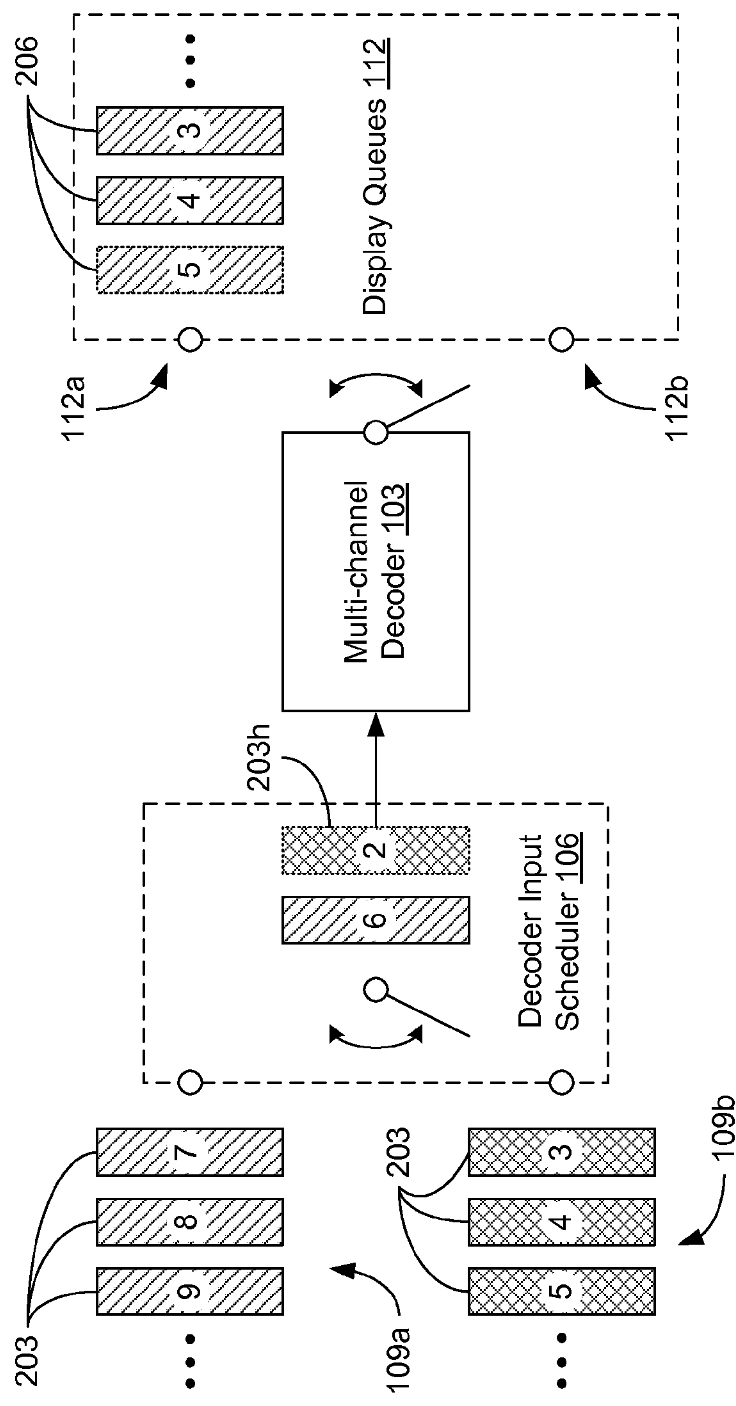

In addition, the decoder input scheduler 106 provides the second CPB or coded frame 203*h* of the second input stream 109*b* for decoding as illustrated in FIG. 7C. After decoding the first CPB or coded frame 203*g* of the second input stream 109*b* is finished, the multi-channel decoder 103 begins decoding the second CPB or coded frame 203*h* of the second input stream 109*b* at the beginning of the next frame period and provides the decoded frame or picture 206 to the display (or picture delivery) queue 112*b* corresponding to the second channel. Thus, the order of decoding during a frame period is reversed with a CPB or coded frame 203 of the second input stream 109*b* being decoded before a CPB or coded frame 203 of the first input stream 109*a*. The decoder input scheduler 106 also resets the maximum decoding latency of the first 1080p30 input stream 109*a* from the initial 16.7 ms to 50 ms (i.e., a frame period of 33.3 ms+16.7 ms). Because of the increase in the maximum decoding latency, display of the frame decoded from CPB or coded frame 203*e* (FIG. 5) for the first channel will be repeated once by the display scheduler 115 (FIG. 1) to maintain the display frame rate.

Figure 7D:
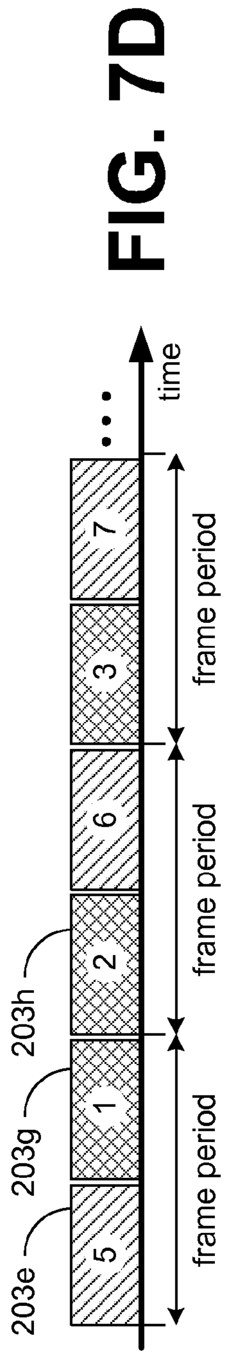

After the second CPB or coded frame 203*h* of the second input stream 109*b* is decoded, the decoder input scheduler 106 continues to arrange the CPBs or coded frames 203 of the 1080p30 input streams 109*a* and 109*b* in an alternating fashion for decoding. In this way, a lower decoding latency is provided for the second input stream 109*b* based upon the low latency priority. FIG. 7D illustrates a portion of the decoding sequence arranged by the decoder input scheduler 106 to illustrate the reversed order. After decoding the first CPB or coded frame 203*g* (FIG. 7A) of the second input stream 109*b*, the second CPB or coded frame 203*h* (FIG. 7C) of the second channel is decoded followed by decoding a CPB or coded frame 203 of the first channel. In the following frame periods, a CPB or coded frame 203 of the second channel is decoded followed by decoding a CPB or coded frame 203 of the first channel. Because of the excess processing capability of the multi-channel decoder 103, coded frames 203 of the second input stream 109*b* are decoded within the low decoding latency and coded frames 203 of the first input stream 109*a* are decoded with a longer decoding latency.

As discussed, the decoder input scheduler 106 also determines the maximum decoding latency of the second input stream 109*b*. Because the second input stream 109*b* has a low latency priority, the maximum decoding latency of the second 1080p30 channel can be set to be 16.7 ms based upon the processing capability of the multi-channel decoder 103. The maximum decoding latency of the first 1080p30 input stream 109*a* remains set at 50 ms. The display scheduler 115 (FIG. 1) uses the maximum decoding latencies to coordinate the display of each decoded frame in the corresponding display queues 112.

When one of the input streams 109*a* or 109*b* stops, the decoder input scheduler 106 provides the next CPB or coded frame 203 in the remaining input stream 109 to the multi-channel decoder 103 at the beginning of the frame period for decoding. The decoder input scheduler 106 also resets the maximum decoding latency of the remaining input stream 109 based upon the associated latency priority (e.g., normal or low). For example, if the second input stream 109*b* of FIG. 7C ends, the decoder input scheduler 106 begins providing CPBs or coded frames 203 of the first input stream 109*a* to the multi-channel decoder 109 as illustrated in FIG. 5 and resets the maximum decoding latency of the first channel back to 16.7 ms following the next frame.

In some implementations, the multi-channel decoder 103 may be capable of processing more than two input streams. The decoder input scheduler 106 may control the ordering of the additional input streams based upon their associated latency priority as can be understood. The decoder input scheduler 106 may order the CPBs or coded frames 203 from multiple input streams 109 as described in the examples presented above to meet the decoding latency for the most or all of the input streams 109. For instance, if a third input stream is obtained, the decoder input scheduler 106 may order the CPBs or coded frames 203 from the three input streams 109 based upon their associated latency priority such that CPBs or coded frames 203 from the third input stream 109 are processed before CPBs or coded frames 203 from the first and second input streams 109, between CPBs or coded frames 203 from the first and second input streams 109, or after CPBs or coded frames 203 from the first and second input streams 109 during a frame period. The ordering may be based upon two latency levels (e.g., normal and low) as discussed above or may include multiple low latency levels in addition to the normal level.

In other embodiments, the latency aware priority based decoding system 100 of FIG. 1 may include a plurality of multi-channel decoders that may operate in parallel. A front end unit (not shown) may direct input streams to a decoder input scheduler 106 based at least in part upon the latency priority of the input stream 109 and the existing loading of the corresponding multi-channel decoder 103. For example, the front end unit may determine the latency priority of each input stream 109 and initially direct input streams 109 with low latency priority to multi-channel decoder 103 that are not processing an input stream 109 or are processing input streams 109 with a low latency priority. If a new input stream 109 has a normal latency priority, then it may be directed to a multi-channel decoder 103 that is processing an input stream 109 with a low latency priority. In this way, the decoding latency of the input streams 109 with low latency priority can be minimized for as long as possible.

While the examples discussed above used a common rate of 30 frames per second, the latency aware priority based decoding system 100 (FIG. 1) may also support input streams 109 having different frame rates. The number of frames processed for each channel by the multi-channel decoder 103 would be adjusted accordingly. For example, if the first channel has a rate of 30 frames per second and the second channel has a rate of 15 frames per second, twice the number of CPBs or coded frames 203 are processed for the first channel than are processed for the second channel in a given time period. Other combinations of frame rates are possible as can be understood. In implementations including a plurality of multi-channel decoders 103, input streams 109 from channels with different frame rates may be directed to different multi-channel decoders 103.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for decoding multiple channels, comprising:

providing coded frames of a first input stream to a multiple channel (multi-channel) decoder for decoding;

obtaining a second input stream;

determining a first latency priority of the first input stream based on at least one of first latency priority data embedded within data in the first input stream or a first application associated with the first input stream, wherein the first latency priority data identifies the first latency priority and is extracted from the data in the first input stream;

determining a second latency priority associated with the second input stream based on at least one of second latency priority data embedded within data in the second input stream or a second application associated with the second input stream, wherein the second latency priority data identifies the second latency priority and is extracted from the data in the second input stream; and providing coded frames from the first and second input streams to the multi-channel decoder for decoding in an order based upon the associated first and second latency priorities.

2. The method of claim 1, further comprising:

decoding the coded frames from the first and second input streams in the order provided; and providing decoded frames of the first input stream and decoded frames of the second input stream to corresponding display queues.

3. The method of claim 2, further comprising:

determining a maximum decoding latency for each input stream based at least in part upon the associated latency priority; and coordinating the display of the decoded frames in the display queues based at least in part upon the maximum decoding latency of the corresponding input stream.

4. The method of claim 1, wherein the first latency priority is a normal latency priority and the second latency priority is a low latency priority.

5. The method of claim 4, wherein providing coded frames from the first and second input streams in an order based upon the associated first and second latency priorities comprises:

providing a first coded frame of the second input stream to the multi-channel decoder for decoding during a current frame period when decoding of a current coded frame of the first input stream is completed and before providing a next coded frame of the first input stream; and providing a second coded frame of the second input stream to the multi-channel decoder for decoding at the beginning of a next frame period before providing the next coded frame of the first input stream.

6. The method of claim 5, further comprising providing the next coded frame of the first input stream to the multi-channel decoder for decoding during the next frame period when decoding of the second coded frame of the second input stream is completed.

7. The method of claim 5, wherein the first coded frame of the second input stream is decoded to produce a decoded frame that is discarded and the second coded frame of the second input stream is decoded to produce a decoded frame that is provided to a display queue corresponding to the second input stream.

8. The method of claim 1, wherein both the first latency priority and the second latency priority are a low latency priority.

9. The method of claim 8, wherein providing coded frames from the first and second input streams in an order based upon the associated first and second latency priorities comprises:

providing a first coded frame of the second input stream to the multi-channel decoder for decoding during a current frame period when decoding of a current coded frame of the first input stream is completed and before providing a next coded frame of the first input stream;

providing a second coded frame of the second input stream to the multi-channel decoder for decoding at the beginning of a next frame period before providing the next coded frame of the first input stream.

10. The method of claim 9, wherein the current coded frame of the first input stream is decoded to produce a decoded frame that is provided to a display queue corresponding to the first input stream.

11. The method of claim 10, further comprising:

resetting a maximum decoding latency of the first input stream by increasing the maximum decoding latency by a frame period;

providing the reset maximum decoding latency to a display scheduler configured to coordinate the display of decoded frames in the display queue corresponding to the first input stream based at least in part upon the maximum decoding latency of the first input stream, wherein the display scheduler repeats display of the decoded frame of the current coded frame of the first input stream to compensate for the increase in the maximum decoding latency of the first input stream.

12. The method of claim 1, wherein the data in the first input stream within which the first latency priority data is embedded is a sequence header.

13. The method of claim 1, wherein the data in the second input stream within which the second latency priority data is embedded is a sequence header.

14. A multiple channel (multi-channel) decoding system, comprising:

a multi-channel decoder configured to decode coded frames from an input stream; and a decoder input scheduler configured to provide coded frames from a plurality of input streams to the multi-channel decoder for decoding, where the coded frames are provided to the multi-channel decoder in an order based at least in part upon latency priorities associated with the input streams determined from one or both of latency priority data embedded within data in the input streams or an application associated with the input streams, wherein the latency priority data identifies the latency priorities and is extracted from the data in the input streams.

15. The multi-channel decoding system of claim 14, wherein the decoder input scheduler is further configured to:

obtain an input stream from a channel; and determine a latency priority associated with that input stream.

16. The multi-channel decoding system of claim 15, wherein the latency priority is determined from latency priority information included in the input stream.

17. The multi-channel decoding system of claim 14, wherein the decoder input scheduler is further configured to:

provide a current coded frame of a first input stream to the multi-channel decoder for decoding during a current frame period, the first input stream associated with a first latency priority;

obtain a second input stream associated with a second latency priority; and provide, during a next frame period, a coded frame from the second input stream to the multi-channel decoder for decoding before providing a next coded frame from the first input stream to the multi-channel decoder if the second latency priority is a low latency priority.

18. The multi-channel decoding system of claim 14, further comprising:

a plurality of display queues, wherein the multi-channel decoder is configured to decode a coded frame provided by the input scheduler from one of the plurality of input streams and provide the decoded frame to one of the plurality of display queues corresponding to the one of the plurality of display queues; and a display scheduler configured to coordinate the display of decoded frames from each of the plurality of display queues, where the display of decoded frames from a display queue is coordinated based at least in part upon a maximum decoding latency of the input stream corresponding to that display queue.

19. The multi-channel decoding system of claim 18, wherein the decoder input scheduler is further configured to:

determine a maximum decoding latency of an input stream based upon the latency priority associated with the input stream; and provide the maximum decoding latency of the input stream to the display scheduler to coordinate the display of decoded frames from the display queue corresponding to the input stream.

20. A method for decoding multiple channels, comprising:

providing a coded frame of an input stream to a multiple channel (multi-channel) decoder for decoding during a current frame period;

determining a first latency priority of the input stream based on at least one of first latency priority data embedded within data in the input stream or a first application associated with the input stream, wherein the first latency priority data identifies the first latency priority and is extracted from the data in the input stream;

obtaining another input stream;

determining a second latency priority of the other input stream based on at least one of second latency priority data embedded within data in the input stream or a second application associated with the other input stream, wherein the second latency priority data identifies the second latency priority and is extracted from the data in the other input stream;

providing a coded frame from each of the input streams to the multi-channel decoder for decoding during a subsequent frame period in an order based at least in part upon the order of the latency priority associated with the initial input stream and the latency priority associated with the other input stream.

21. The method of claim 20, wherein the plurality of ordered latency priorities includes a normal latency and a plurality of lower latency priorities.

22. The method of claim 20, wherein the coded frame from the other input stream is provided before the coded frame from the initial input stream if the latency priority associated with the initial input stream is higher than the latency priority associated with the other input stream.

* * * * *